Sept. 30, 1958     C. T. FREELING ET AL     2,854,243
FOLDING CART
Filed Feb. 20, 1956                          2 Sheets-Sheet 1
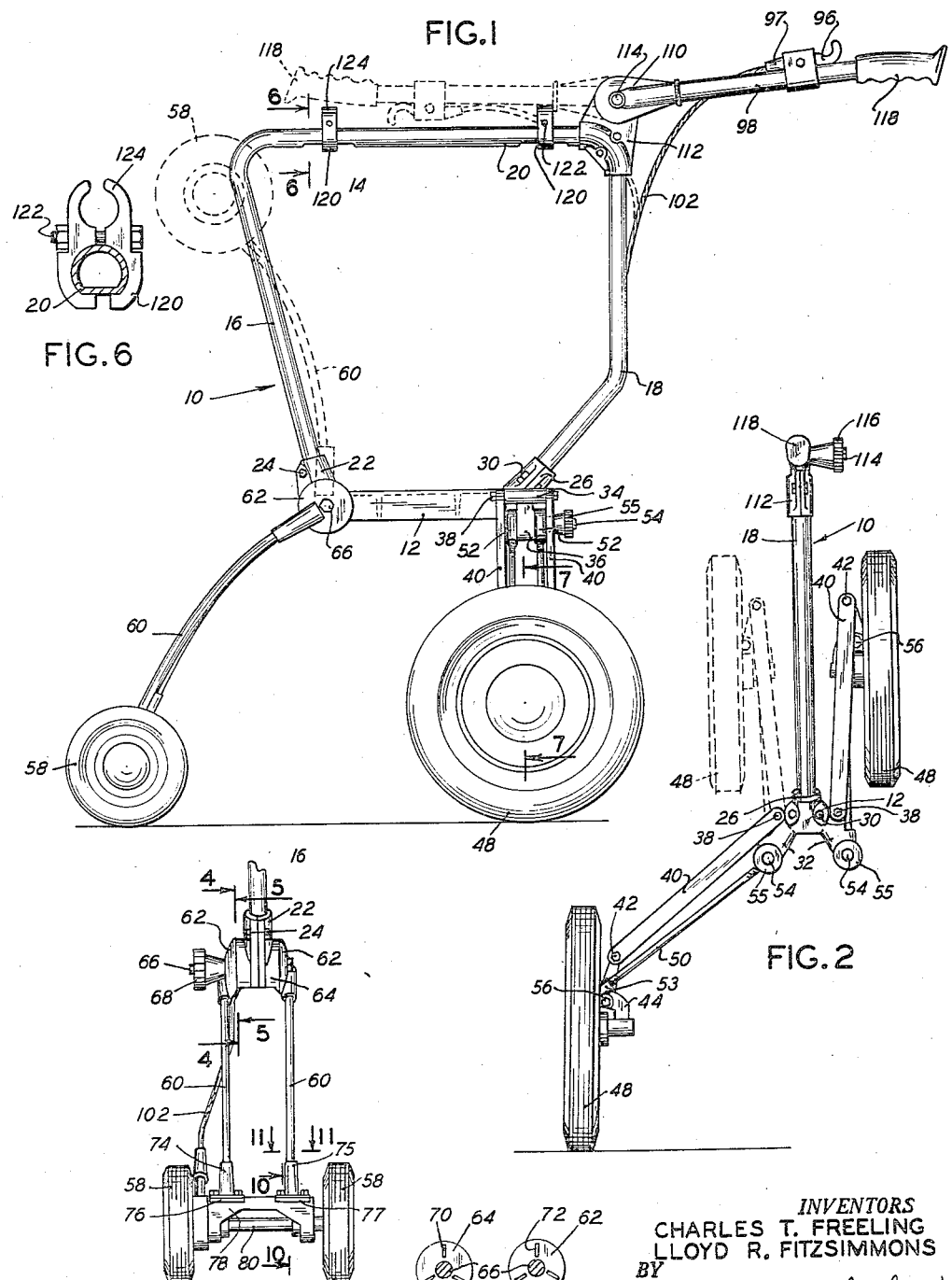
INVENTORS
CHARLES T. FREELING
LLOYD R. FITZSIMMONS
BY Buckhorn and Cheatham
ATTORNEYS Sept. 30, 1958 C. T. FREELING ET AL 2,854,243
FOLDING CART
Filed Feb. 20, 1956 2 Sheets-Sheet 2
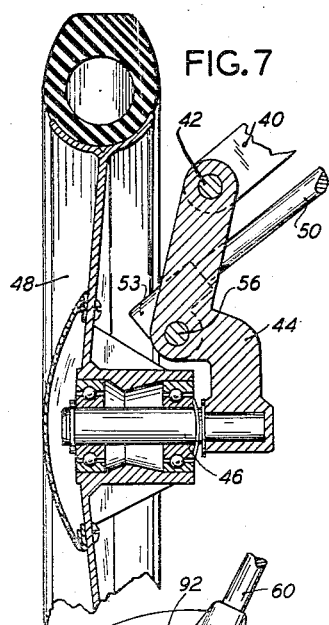
FIG.7
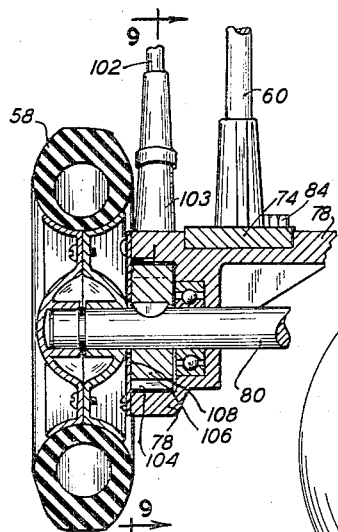
FIG.8
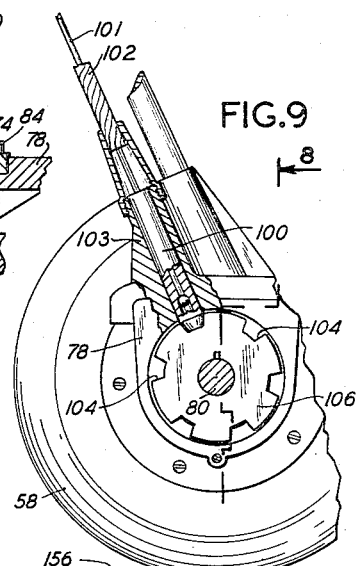
FIG.9
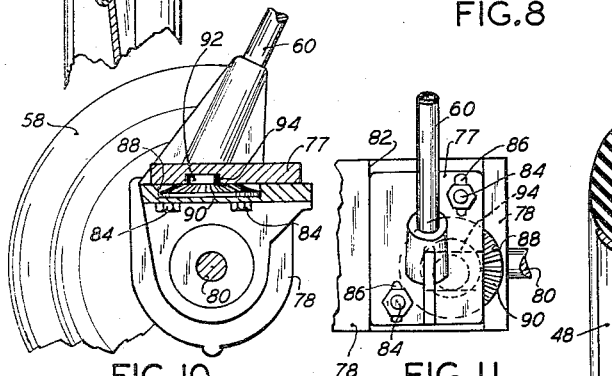
FIG.10 FIG.11 FIG.12 FIG.14
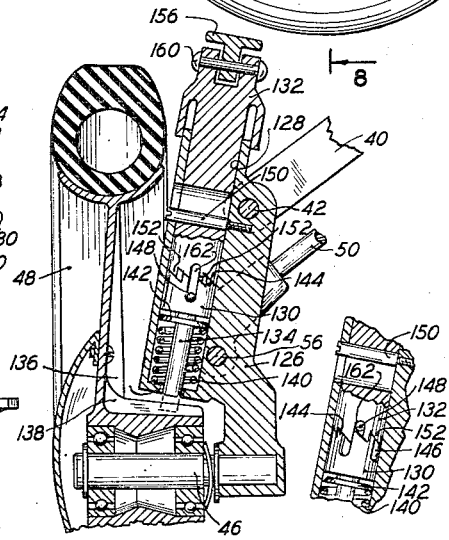
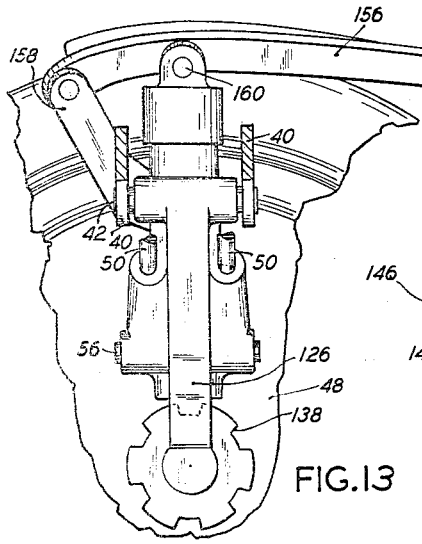
FIG.13
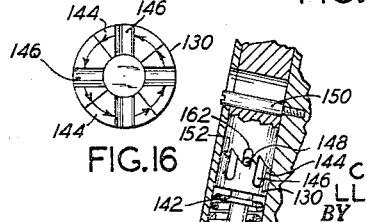
FIG.16 FIG.15
INVENTORS
CHARLES T. FREELING
LLOYD R. FITZSIMMONS
BY Buckhorn and Cheatham
ATTORNEYS United States Patent Office 2,854,243
Patented Sept. 30, 1958

2,854,243

FOLDING CART

Charles T. Freeling and Lloyd R. Fitzsimmons, Portland, Oreg., assignors to Product Engineering Company, Portland, Oreg., a corporation of Oregon Application February 20, 1956, Serial No. 566,471

8 Claims. (Cl. 280—42)

This invention relates to a folding cart and more particularly to a cart having a central longitudinally and vertically extending frame and providing ground engaging wheels carried by spring strut structures which can be folded up adjacent the frame to provide a compact folded structure capable of being stored or transported in a small space.

The cart of the present invention was primarily developed for use by postmen in delivering mail and in its preferred form has provision for attaching thereto a pair of mail bags, one on each side of the frame. The frame is preferably made up of a lower horizontal frame member having attaching portions cast integrally therewith for pivotally receiving one end of wheel carrying spring strut structures and also for receiving the ends of an upwardly extending inverted U-shaped tubular member having an upper longitudinally extending portion carrying hooks to which mail bags may be attached. The upper rear corner of the frame carries a handle which may be pivoted between an operating position extending rearwardly of the frame and a folded position extending forwardly along the frame. Rear spring strut structures, each carrying a ground engaging rear wheel, are pivoted to an attaching portion at the lower rear corner of the frame so as to extend laterally and downwardly therefrom when in operating position, the spring strut structures including a parallelogram linkage so that the rear wheels may be maintained in a vertical position and be folded up against the sides of the frame. A spring strut structure for the front wheels has one end pivoted to an attaching portion of the frame at its lower front corner so that such strut structure and wheels may be moved between an operating position extending forwardly and downwardly from the frame in which the front wheels are in ground engaging position and a folded position in which the front wheels are positioned adjacent the upper front corner of the frame. Provision is made for locking all of the spring strut structures, as well as the handle, in either operating or folded position and also a brake mechanism is provided for positively locking at least one of the wheels against rotation.

It is therefore an object of the present invention to provide an improved folding cart in which a plurality of wheels are supported on spring strut structures which may be folded up against the frame so as to position the wheels closely adjacent the frame.

Another object of the invention is to provide a folding cart in which rear ground engaging wheels are carried by foldable spring strut structures each involving a parallelogram linkage mechanism pivoted to the frame of the cart for maintaining the wheels vertical and in which an improved locking mechanism for locking the strut structure either in operating position or in folded position is employed.

Another object of the invention is to provide a folding cart in which front ground engaging wheels are carried by a forwardly and downwardly extending spring strut structure when the wheels are in ground engaging position and in which provision is made for folding the front wheel strut structure upwardly against the frame of the cart.

A further object of the invention is to provide a foldable cart in which ground engaging wheels are carried upon spring strut structures pivoted to the frame of the cart and provision is made for selectively locking one of the ground engaging wheels against rotation when in ground engaging position.

A still further object of the invention is to provide a folding mail cart in which a lower horizontally extending frame member provides a base having integral attaching portions to which wheel carrying spring strut structures are pivoted and also provides integral attaching portions for an upwardly extending frame member forming a support for mail bags.

Other objects and advantages of the invention will appear in the following description of the preferred embodiment given in connection with the attached drawings of which:

Fig. 1 is a side elevation of the cart of the present invention showing the wheels and handle in operating position in full lines and the front wheels and handle in folded position in dotted lines;

Fig. 2 is a partial rear view of the mail cart with the front wheels and their supporting structure and brake structure omitted and showing in full lines one of the rear wheels in operating position and the other rear wheel in folded position, the first mentioned rear wheel also being shown in folded position in dotted lines;

Fig. 3 is a fragmentary front elevation of the cart showing the front wheels and supporting structure therefor;

Fig. 4 is a fragmentary cross section taken on the line 4—4 of Fig. 3 and showing the locking projections on the lower frame element for holding the front wheel supporting struts in either operating or folded position;

Fig. 5 is a view similar to Fig. 4 taken on the line 5—5 of Fig. 3 and showing the locking recesses carried by the upper ends of spring struts for the front wheels;

Fig. 6 is a fragmentary vertical section taken on the line 6—6 of Fig. 1 and showing a bag supporting hook on an enlarged scale;

Fig. 7 is a fragmentary vertical section on an enlarged scale taken on the line 7—7 of Fig. 1;

Fig. 8 is a fragmentary vertical section on an enlarged scale through a front wheel and its brake structure and taken on the line 8—8 of Fig. 9;

Fig. 9 is a fragmentary vertical section taken on the line 9—9 of Fig. 8;

Fig. 10 is a fragmentary vertical section on an enlarged scale taken on the line 10—10 of Fig. 3;

Fig. 11 is a fragmentary horizontal section on an enlarged scale taken on the line 11—11 of Fig. 3;

Fig. 12 is a view similar to Fig. 7 showing a modified form of brake structure;

Fig. 13 is a fragmentary view showing the brake structure of Fig. 12 in side elevation;

Fig. 14 is a fragmentary vertical section showing certain of the parts of Fig. 12 in a different position;

Fig. 15 is a view similar to Fig. 14 showing the parts of Fig. 14 in a still different position; and Fig. 16 is a plan view on an enlarged scale of the upper end of the brake plunger of Figs. 12 to 15, the arrows showing the direction of downward slope of camming surfaces on axially extending teeth on the upper end of such plunger.

Referring more particularly to the drawings, the cart of the present invention is shown in side elevation in Fig. 1 and includes a centrally open frame 10 made up of a frame member 12 of inverted channel form forming the lower frame element; and an upper tubular frame member 14 of inverted U-shape providing a vertically extending front frame portion 16, a vertically extending rear frame portion 18 and a horizontally extending upper frame portion 20. The lower frame member 12 is preferably of cast metal and at its front end it is provided with an integral upwardly and forwardly extending socket member 22 for receiving the lower end of the front portion of the upper frame member. The socket member 22 is split along its front edge and is clamped about such end of the upper frame member by means of a clamping bolt 24. The lower frame member 12 is also provided at its rear end with an integral upwardly and rearwardly extending socket 26 for receiving the lower end of the rear portion of the upper frame member 18. The socket structure 26 is split laterally and clamped about such lower end by clamp bolts 30.

The rear end of the lower frame member 12 has integral flange members 32 extending from opposite sides thereof, each of the flange members providing an upper bearing portion 34 and a lower bearing and locking portion 36 forming an attaching means for rear wheel carrying spring strut structures. The upper bearing portions 34 receive pivot pins 38 to each of which are secured the ends of a pair of links 40 which are spaced longitudinally of the cart. The pairs of links 40 are also each secured at their other ends to a pivot pin 42 journaled in an axle carrying member 44. As most clearly shown in Fig. 7, the axle carrying members 44 each have a stub axle 46 extending laterally therefrom and each axle has a ground engaging wheel 48 journaled thereon.

A pair of spring struts 50 also extend between each bearing and locking portion 36 and the corresponding axle supporting member 44. The spring struts have locking plates 52 secured to their upper ends and such locking plates 52 are clamped against the end faces of a bearing and locking portion 36 by means of a clamping screw 54 extending through the locking plates 52 and the locking portion 36. The screws 54 each receive an enlarged knurled nut 55 for clamping the plates 52 against the locking portion 36. As described more fully below, the locking portions 36 and the locking plates 52 have interengaging projections and recesses, respectively, providing for locking the spring struts 50 in the lowermost position shown in full lines at the left of Fig. 2, or in the uppermost position shown in dotted lines at the left of Fig. 2. The lower ends of each pair of spring struts 50 have attaching members 53 secured thereto and also secured to a pivot pin 56 extending laterally through and journaled in an axle supporting member 44. The links 40 and spring struts 50 form a parallelogram linkage so that the wheels 48 maintain their substantially vertical position when the locking plates 52 are released from the locking member 36 by loosening the nut 55 and the struts are manually moved between their lowermost position and uppermost position.

The front wheels 58 are also carried by a spring strut structure including a pair of spring struts 60 having locking plates 62 secured to their upper ends and engaging the ends of a locking member 64 which is an integral part of the front end of the lower frame member 12. The locking plates 62 and locking member 64 have a clamping bolt 66 extending therethrough, the clamping bolt 66 receiving a knurled nut 68 for clamping the locking plates 62 against the locking member 64. As shown in Figs. 4 and 5, the locking member 64 has projections 70 extending from its end faces and the locking plates 62 have corresponding recesses 72 in their faces which engage the locking member 64. Such projections and recesses interengage to lock the struts 60 either in the operating position shown in full lines in Fig. 1, or in the folded position shown in dotted lines in Fig. 1.

The lower ends of the spring struts 60 have attaching members 74 and 75 secured thereto, the member 74 terminating in a flange portion 76 and the member 75 terminating in a flange portion 77. The flange portions 76 and 77 are secured to the upper surface of an axle receiving member 78. The axle receiving member 78 has an axle 80 journaled therein to which the front wheels 58 are secured. The flange portion 77 of the attaching member 75 is adjustably mounted on the axle receiving member 78, as more clearly shown in Figs. 10 and 11, so that the front wheels may be aligned to cause the cart to roll in a straight line. Thus, the flange member 77 is seated in a slot 82 extending longitudinally of the cart along the top of the axle receiving member 78. The flange member is held in adjusted position by bolts 84 extending upwardly through the axle receiving member 78 and through slots 86 in the flange member 77. To provide for ease in making minor adjustments of the position of the flange member 77 in the slot 82, the axle receiving member 78 below the flange member 77 has a circular recess 88 receiving the circular lower portion of an eccentric adjusting member 90. The circular recess 88 extends laterally outside the flange member 77 at one side thereof so as to expose a portion of the periphery of the eccentric member 90. The eccentric member 90 has an upwardly extending eccentric circular boss 92 received in a laterally extending slot 94 in the bottom surface of the flange member 77. The upper surface of the lower portion of the eccentric member 90 may be knurled or provided with radially extending notches to facilitate turning the eccentric member 90 with a suitable tool so as to cause controlled movement of the flange member 77 longitudinally of the cart in the slot 82 in the axle receiving member 78. That is to say, the nuts on the bolts 84 may be loosened and the eccentric member 90 turned a desired amount after which the nuts on the bolts 84 may again be tightened to hold the flange member 77 in an adjusted position. It will be apparent that this will adjust the tracking of the front wheels so as to enable the cart to follow a straight line.

In the modification shown in Figs. 1 to 9, inclusive, one of the front wheels 58 is provided with a positive brake which may be applied or released by a brake actuating member 96 mounted for reciprocation in a housing 97 secured to the handle 98 for the cart. The brake actuating member 96 is connected to a brake plunger 100, best shown in Fig. 9, by means of a flexible wire 101 reciprocable in a sheath 102. The plunger 100 is mounted for reciprocation in a boss 103 extending upwardly and rearwardly from one side of the axle receiving member 78 for the front wheel axle. The lower end of the plunger 100 is positioned to engage in notches 104 in the periphery of a circular member 106 concentric with and keyed to the axle 80. The member 106 is positioned in an axially extending recess in one end of the axle receiving member 78, the recess being closed by a cover plate 108 through which the axle 80 extends. It will be apparent that the brake actuating member 96 can be employed to reciprocate the plunger 100 through the wire 102, the plunger being frictionally maintained either in its brake applying position shown in Fig. 9, or in a retracted or brake releasing position.

The handle 98 has a locking plate 110 at one end pivotally secured to a handle supporting member 112 clamped on the upper rear corner of the frame, the plate 110 being pivotally mounted upon a locking bolt 114 extending through the handle supporting member 112 and having a knurled nut 116 thereon. The locking plate 110 and the handle supporting member 112 having mating serrated faces (not shown), thus causing the handle to be held in adjusted position when the nut 114 is tightened. As shown in Fig. 1, the free end of the handle 98 is provided with a hand grip 118. It will be apparent that loosening the nut 114 will enable the handle to be moved between the operating position shown in full lines and the folded position shown in dotted lines in Fig. 1.

The upper frame member 14 has a pair of mail bag supporting hooks 120 secured to its upper portion 20 in fore-and-aft relation thereto, the hooks 120 being each constructed of two similar parts clamped together by a clamping bolt 122 and receiving the frame member between their lower ends. As shown in Fig. 6, the portions of the frame member upon which the mail bag hooks are mounted have their lower surfaces flattened and the hook parts are formed to engage such flattened portions so that the mail bag hooks are held against rotation upon the frame element. The upwardly extending portions 124 of the hooks 120 provide hook portions for receiving loops or rings carried by mail bags so that the mail bag may be positioned on either side of the frame 10 of the cart, the open frame, in such case, permitting the bag to swing into a central position with the mass thereof in the axial plane of the cart. Of course, two bags may be carried in saddle bag relation, which would also result in the mass being centrally disposed.

In the position of the wheels and handles shown in Fig. 1, the frame 10 of the cart is supported upon the front wheels 58 and the rear wheels 48 by means of the spring strut structures described above. The handle 98 enables the cart to be maneuvered along pavements or over rough surfaces and the spring strut structures, including the spring struts 50 and 60, cushion the cart against shocks such as are encountered in moving the carts over curbs, up and down steps, etc. The rear wheels 48 are held in ground engaging position by the locking mechanism including the clamping bolt 54, nut 55 and the locking plates at the upper ends of the spring struts which engage locking faces on the bearing and locking portions 36 of the frame member 12. The locking plates 52 and the portion 36 have interengaging recesses and projections of the same type as the recesses 72 and projections 70, respectively shown in Figs. 4 and 5, and it will be apparent that loosening nut 55 will enable the strut structure, including the struts 50, to be rotated approximately 120° between the position shown in full lines at the left in Fig. 2 and the position shown in dotted lines in Fig. 2. The parallelogram linkages provided by the struts 50, links 40, axle supporting members 44 and frame member 12 cause the wheels 28 to remain substantially parallel to the frame 10 during movement of the wheels from operating position to folded position. In order to assist in such movement, the spring struts 50 are preferably given an initial set which tends to resiliently separate the locking plates 52 at the upper ends of the struts when the nuts 55 are loosened so that the locking plates 52 tend to free themselves from faces of the locking portions 36 of the frame 12.

The ground engaging front wheels 58 are also held in operating position by the locking mechanism described above, including the clamping bolt 66 and nut 68 holding the locking plates 62 at the upper ends of the spring struts 60 against the locking member 64. By loosening the nut 68 the struts 60 carrying the wheels 58 can be rotated between their operating position and folded position through an angle of approximately 120°. Tightening the nut 68 holds the struts 60 in either position by reason of the interengaging projection 70 and recesses 72 on the locking member 64 and locking plates 62, respectively.

The handle 98, as described above, may be moved between a folded position shown in dotted lines in Fig. 1 and a selected operating position, such as the position shown in full lines in Fig. 1, by loosening the nut 116 on the bolt 114. As stated above, the locking plate 110 on the frame end of the handle has a serrated surface mating with a serrated surface upon the handle supporting member 110. It will be apparent from a comparison of Figs. 2 and 3 that the distance between front wheels 58 is approximately the same as the distance between the rear wheels 48 when the rear wheels are in the folded position.

All of the structural members of the cart are preferably made of light weight metal, such as aluminum or magnesium, except the spring struts 50 and 60 which may be of spring metal, such as steel, and also certain other elements such as the axles 46 and 80 and bearing therefor, which also may be made of steel or similar material. The frame element 12 is preferably a light weight metal casting, whereas the upper frame member 14 may be of extruded light weight metal tubing, as may also be the handle 98. The axle supporting member 44 may be a cast member cast around an end of the axle 46 and the end portions of the struts 50 and 60 may likewise be cast members cast around the end of the spring struts. It will, of course, be apparent that any of the cast members of light weight metal may, if necessary, have inserts of other metals positioned therein during the casting operation in any portions subjected to wear or high stress.

A modified type of brake structure is shown in Figs. 12 to 16, inclusive. Instead of employing a hand actuated brake upon one of the front wheels 58, a brake may be applied to one of the rear wheels 48. Thus, the axle supporting member 126 for one of the wheels 48 may have a bore 128 therein which receives a brake actuating mechanism, including a brake plunger 130 and an actuating plunger 132. The brake plunger 130 has a lower reduced portion 134 extending from the lower end of the bore 128 through a guiding aperture 136. The reduced portion 134 of the plunger 130 engages in one of a series of notches 138 formed in the outer surface of the hub of the wheel 48 when the plunger is moved to a lower position and is retracted from such notches when moved to the upper position shown in Fig. 12. The plunger 130 is urged to its upper position by a compression spring 140 in the bore 128 and bearing at its upper end against a disc 142 journaled on the plunger 130 so that the plunger 130 is free to rotate. The upper end of the plunger 130 is provided with eight axially extending circumferentially disposed camming teeth 144. Such teeth have upper camming surfaces which are inclined circumferentially toward the other end of the plunger as indicated by the arrows in Fig. 16. A pair of slots 146 extend diametrically across the upper face of the plunger 130 and are disposed at right angles to each other. The slots 146 occupy positions corresponding to the deepest portion of the notches between alternate teeth and are of substantial depth in a direction axially of the plunger. A stationary pin 148 extends diametrically across the bore 128 and is received in one of the slots 146 when the plunger 130 is in its retracted position shown in Fig. 12.

The brake actuating plunger 132 is held against rotation in the bore 128 by another stationary pin 150 extending diametrically across the bore 128, the pin 150 being received in a longitudinally extending slot in the plunger 132. The lower end of the plunger 132 has camming teeth 152 thereon which have camming surfaces similar to those of the teeth 144 on the plunger 130 and which engage the camming surfaces of the teeth 144. The plunger 132 may be reciprocated in the bore 128 by a foot lever 156 having one end pivotally connected to an arm 158 carried by the axle supporting member 126 and also pivotally connected intermediate its end by a pivot pin 160 to the top of the plunger 132. The actuating plunger 132 also has a diametrically extending slot 162 in its face in alignment with the pin 148 and when the slots 162 and 146 are in alignment, the teeth 152 on the plunger 132 are angularly displaced approximately 22½° from the teeth 144 on the plunger 130.

In Fig. 12, the plungers 130 and 132 are both in their upper positions and the pin 148 is received in the slot 146. In this position the slots 146 and 162 are in alignment. When force is applied to the plunger 132 by the foot lever 156 to move it downwardly, the plunger 130 is also moved downwardly against the force of the spring 140 until the upper edge of the slot 146 in the plunger 130 clears the pin 148. The camming surfaces of the teeth on the two plungers then enable the spring 140 to move the plunger 130 upwardly a short distance relative to the plunger 132 and cause the plunger 130 to rotate 22½° so that the plungers assume the positions shown in Fig. 14. In this position the upper camming surface of a tooth 144 of the plunger 130 is below the pin 148 and upon release of the force on the upper plunger 132, the plunger 130 is further moved upwardly by the spring 140 and caused to move angularly another 22½° into the position shown in Fig. 15. This positions the pin 148 in a notch between two teeth which is spaced from the slots 146. The plunger 130 is held down by the pin 148 against the force of the spring 140 so that the lower end of the plunger is positioned in one of the notches 138 of the wheel 48. To release the wheel, the foot lever 156 is again depressed to move the plunger 132 downwardly into the bore 128. As soon as the top of the next tooth 144 of the plunger 130 clears the pin 148, the plunger 130 again is again rotated 22½° by the camming action of the teeth of the two plungers and the spring 140 so that a camming surface on a tooth 144 of the plunger 130 is again below the pin 148. Upon release of the plunger 132 so that it can again travel upwardly, the plunger 130 again rotates 22½° and the pin 148 drops into the next slot 146 so that the lower end of the plunger 130 is retracted by the spring from engagement with the notches 138 of the wheel hub. Alternate actuations of the foot lever 156 will thus apply and release the brake. In operating either the brake of Figs. 1 to 11, or that of Figs. 12 to 16, the cart can be slightly moved during application of the brake so that the brake plunger will enter one of the notches. The structure of Figs. 12 to 16 may otherwise be the same as the structure of Figs. 1 to 9, and either structure provides a cart, which is of simple construction, which is supported upon spring strut structures and which can be folded into a small space.

We claim:

1. A folding cart for carrying mail bags comprising a central, centrally open frame extending longitudinally and vetrically of said cart, mail bag attaching members carried by the upper portion of said frame in fore-and-aft relation thereto, a handle having one end pivotally secured to the upper rear portion of said frame for movement of said handle between an operating position extending upwardly and rearwardly from said frame and a folded position extending forwardly adjacent said upper portion of said frame, a pair of rear spring strut structures each having a ground engaging rear wheel carried by one end thereof, said strut structures each having its other end pivotally connected to the lower rear portion of said frame for movement of said strut structures between an operating position in which said strut structures extend downwardly and laterally from said frame and a folded position in which said strut structures each extend upwardly adjacent a side of said frame, a front spring strut structure having a ground engaging front wheel carried by one end thereof, said front spring strut structure having its other end pivotally connected to the lower front portion of said frame for movement between an operating position in which said front strut structure extends forwardly and downwardly from said frame and a folded position in which said front strut structure extends upwardly adjacent the front of said frame, and means for releasably locking said handle and said other end of each of said spring strut structures in said operating position, said front strut structure including a pair of front spring struts extending between the ends thereof, an axle supporting member secured to said front spring struts at said one end of said front strut structure, an axle carried by said supporting member, a pair of front wheels carried on opposite ends of said axle, and adjusting means between said axle supporting member and one of said front struts to provide for aligning said front wheels with the rear wheels of said cart.

2. A folding cart comprising a frame, a plurality of wheels, axle structures for said wheels, and a spring strut structure connecting at least one of said axle structures to said frame, said strut structure including two spaced spring strut members extending between said one of said axle structures and said frame, said strut members each terminating adjacent said frame in a locking member, the locking members of said strut members being spaced from each other, said frame having a locking portion extending between said locking members, pivot means for connecting said locking members to said locking portion to provide for pivotal movement of said strut structure between a folded position adjacent said frame and an outwardly extending operating position, clamping means for releasably clamping said locking members against said locking portion, said locking members and locking portion having interengaging elements preventing said pivotal movement when said locking members are clamped against said locking portion, said spring strut members providing for separating said locking members to disengage said interengaging elements when said clamping means is released.

3. A folding cart comprising a frame, a plurality of wheels including front and rear wheels, a rear wheel axle structure on each side of said frame, a front wheel axle structure in front of said frame, a spring strut structure connecting each of said axle structures to said frame, said strut structure including two spring strut members extending between said one of said axle structures and said frame, said strut members each terminating adjacent said frame in a locking member, the locking members of said strut members being spaced from each other, said frame having a locking portion extending between said locking members, pivot means for connecting said locking members to said locking portion to provide for pivotal movement of said strut structure between a folded position adjacent said frame and an outwardly extending operating position, clamping means for releasably clamping said locking members against said locking portion, said locking members and locking portion having interengaging portions preventing said pivotal movement when said locking members are clamped against said locking portion, said spring strut members resiliently separating said locking members to disengage said interengaging portions when said clamping means is released.

4. A folding cart comprising a frame, a pair of wheels, an axle structure for one of said wheels on each side of said frame, a spring strut structure connecting each of said axle structures to said frame, said strut structure including two spring strut members extending between one of said axle structures and said frame, said strut members each terminating at one end thereof adjacent said frame in a locking member, the locking members of said strut members being spaced from each other, said frame having a locking portion extending between said locking members, pivot means for pivotally connecting said locking members to said locking portion, pivot means connecting the other ends of said strut members to said axle structures, a link structure pivotally connected to said frame and said axle structure to form a parallel linkage with said strut members to provide for pivotal movement of said strut structure between a folded position adjacent said frame and an outwardly extending operating position while maintaining said wheels parallel to each other, clamping means for releasably clamping said locking members against said locking portion, said locking members and locking portion having interengaging portions preventing said pivotal movement when said locking members are clamped against said locking portion, said spring strut members resiliently separating said locking members to disengage said interengaging portions when said clamping means is released.

5. A folding cart comprising a frame, a plurality of wheels including a pair of front wheels, an axle structure for said front wheels, and a spring strut structure connecting said axle structures to said frame, said strut structure including two spaced spring strut members extending between said one of said axle structures and said frame, said strut members each terminating adjacent said frame in a locking member, the locking members of said strut members being spaced from each other, said frame having a locking portion extending between said locking members, pivot means for pivotally connecting said locking members to said locking portion to provide for pivotal movement of said strut structure between a folded position adjacent said frame and a forwardly extending operating position, clamping means for releasably clamping said locking members against said locking portion, said locking members and locking portion having interengaging elements preventing said pivotal movement when said locking members are clamped against said locking portion, said spring strut members resiliently separating said locking members to disengage said interengaging elements when said clamping means is released.

6. A folding cart comprising a frame, a plurality of wheels, axle structures for said wheels, and a spring strut structure connecting at least one of said axle structures to said frame, said strut structure including two spaced spring strut members extending between said one of said axle structures and said frame, said strut members each terminating adjacent said frame in a locking member, the locking members of said strut members being spaced from each other, said frame having a locking portion extending between said locking members, pivot member extending through said locking members and said locking portion for connecting said locking members to said locking portion to provide for pivotal movement of said strut structure between a folded position adjacent said frame and an outwardly extending operating position, clamping means on said pivot member for releasably clamping said locking members against said locking portion, said locking members and locking portion having interengaging elements preventing said pivotal movement when said locking members are clamped against said locking portion, said spring strut members providing for separating said locking members to disengage said interengaging elements when said clamping means is released.

7. A folding cart comprising a frame structure, a plurality of wheels including a pair of rear wheels and a pair of front wheels, an axle structure in front of said frame for said front wheels, a spring strut structure connecting each said axle structures to said frame, said strut structure including two spring strut members extending between said axle structure and said frame, said strut members each terminating adjacent said frame in a locking member, the locking members of said strut members being spaced from each other, said frame having a locking portion extending between said locking members, pivot means for connecting said locking members to said locking portion to provide for pivotal movement of said strut structure between a folded position adjacent said frame and forwardly extending operating position, clamping means for releasably clamping said locking members against said locking portion, said locking members and locking portion having interengaging portions preventing said pivotal movement when said locking members are clamped against said locking portion, said spring strut members resiliently separating said locking members to disengage said interengaging portions when said clamping means is released, and adjusting means between said axle structure and one of said strut members to provide for aligning said front wheels with said rear wheels.

8. A folding cart comprising a central frame structure, a plurality of wheels including front and rear wheels, a rear wheel axle structure on each side of said frame, a front wheel axle structure in front of said frame, a handle extending rearwardly from said frame, a spring strut structure connecting each of said axle structures to said frame, said strut structure including two spring strut members extending between said one of said axle structures and said frame, said strut members each terminating adjacent said frame in a locking member, the locking members of said strut members being spaced from each other, said frame having a locking portion extending between said locking members, pivot means for connecting said locking members to said locking portion to provide for pivotal movement of said strut structure between a folded position adjacent said frame and an outwardly extending operating position, clamping means for releasably clamping said locking members against said locking portion, said locking members and locking portion having interengaging portions preventing said pivotal movement when said locking members are clamped against said locking portion, said spring strut members resiliently separating said locking members to disengage said interengaging portions when said clamping means is released, said front wheel axle structure including a front wheel axle and a bearing structure therefor, a positive locking brake structure including interengaging parts on said axle and bearing structure, and means carried by said handle for engaging and disengaging said parts.

References Cited in the file of this patent

UNITED STATES PATENTS

| | | |
|---|---|---|
| D. 170,636 | Gastright | Oct. 20, 1953 |
| 1,693,633 | Allen | Dec. 4, 1928 |
| 2,582,435 | Howard | Jan. 15, 1952 |
| 2,598,046 | Frey | May 27, 1952 |
| 2,659,612 | Williamson | Nov. 17, 1953 |
| 2,725,240 | Johnson | Nov. 29, 1955 |
| 2,772,890 | Gastright | Dec. 4, 1956 |
| 2,775,464 | Williamson | Dec. 25, 1956 |

FOREIGN PATENTS

| | | |
|---|---|---|
| 342,886 | France | May 5, 1904 |